United States Patent [19]
Eberth et al.

[11] Patent Number: 5,608,406
[45] Date of Patent: Mar. 4, 1997

[54] DEVICE FOR CONTROLLING DISCHARGE OF A CHARGE CAPACITOR IN A TRANSPONDER

[75] Inventors: Gerhard Eberth, Eching-Weixerau; Josef H. Schuermann, Oberhummel, both of Germany

[73] Assignee: Texas Instruments Incorporated, Dallas, Tex.

[21] Appl. No.: 667,343

[22] Filed: Jun. 20, 1996

Related U.S. Application Data

[63] Continuation of Ser. No. 371,726, Jan. 12, 1995, abandoned.

[51] Int. Cl.$^6$ ............................................. G01S 13/75
[52] U.S. Cl. .......................................................... 342/51
[58] Field of Search ................................. 342/42, 44, 45, 342/50, 51

[56] References Cited

U.S. PATENT DOCUMENTS

| | | | |
|---|---|---|---|
| 4,333,072 | 6/1982 | Beigel | 340/825.54 |
| 5,041,826 | 8/1991 | Milheiser | 340/825.54 |
| 5,053,774 | 10/1991 | Schuermann et al. | 342/44 |
| 5,489,908 | 2/1996 | Orthmann et al. | 342/42 |
| 5,491,484 | 2/1996 | Schuermann | 342/51 |
| 5,500,651 | 3/1996 | Schuermann | 342/42 |

FOREIGN PATENT DOCUMENTS

| | | |
|---|---|---|
| 0568067A1 | 11/1993 | European Pat. Off. . |
| 0568066A1 | 11/1993 | European Pat. Off. . |

*Primary Examiner*—John B. Sotomayor
*Attorney, Agent, or Firm*—Rebecca A. Mapstone; James C. Kesterson; Richard L. Donaldson

[57] ABSTRACT

A transponder device (10) includes a discharge circuit (18) to control the discharge of voltage from a charge capacitor (14). The discharge circuit (18) prevents transmission of a data telegram by the transponder device (10) until a voltage of the charge capacitor (14) reaches a threshold voltage level. The threshold voltage level is sufficient to ensure that a complete transmission of the data telegram is performed. Upon reaching the threshold voltage level, a transponder analog and digital circuit (19) initiates transmission of the data telegram. A control logic circuit (32) activates a counter (36) upon the start of the data telegram transmission. The counter (36) generates a control signal that is used to bypass the discharge circuit in order that the charge capacitor (14) can be connected directly to the transponder analog and digital circuit (19). In this manner, sufficient voltage is available at the beginning and end of the data telegram transmission in order to avoid deterioration of the data telegram transmission signal.

17 Claims, 1 Drawing Sheet

DEVICE FOR CONTROLLING DISCHARGE OF A CHARGE CAPACITOR IN A TRANSPONDER

This application is a Continuation of application Ser. No. 08/371,726, filed Jan. 12, 1995 now abandoned.

TECHNICAL FIELD OF THE INVENTION

The present invention relates in general to transponder communications and more particularly to a device for controlling discharge of a charge capacitor in a transponder.

BACKGROUND OF THE INVENTION

An HDX (half duplex) transponder device typically includes a charge capacitor that provides operational power for the transponder device in response to receipt of an interrogation signal. The charge capacitor provides the necessary voltage to allow the transponder to send a data telegram upon activation by the interrogation signal. However, the transponder device has no control mechanism determining whether or not the energy stored into the charge capacitor is high enough to transmit the full data telegram. As soon as the charge capacitor reaches the minimum operating voltage for the transponder device, a high peak discharge of energy stored within the charge capacitor occurs, resulting in a low energy/voltage level towards the end of the data telegram transmission phase. Without sufficient energy at the end of the data telegram transmission phase, an incomplete telegram may be sent or the data telegram transmission signal may be so weak that it reduces the transmission range for the transponder device. Therefore, it is desirable to have a transponder device that controls the voltage of the charge capacitor at the beginning of a data telegram transmission phase and regulates it to a constant value during the data telegram transmission phase.

SUMMARY OF THE INVENTION

From the foregoing, it may be appreciated that a need has arisen for a transponder device that controls the discharge of energy stored within the charge capacitor. A need has also arisen for a transponder device that can transmit a data telegram without any deterioration in range of the transponder signal. Further, a need has arisen to control the voltage of the charge capacitor before the start of the data telegram transmission.

In accordance with the present invention, a device for controlling discharge of a charge capacitor in a transponder is provided that substantially eliminates or reduces disadvantages and problems associated with conventional transponder devices.

According to an embodiment of the present invention, there is provided a transponder device that includes a charge capacitor operable to store voltage in response to an interrogation signal. A transponder analog and digital circuit transmits a data telegram in response to discharge of the voltage stored within the charge capacitor. A discharge circuit prevents the charge capacitor from discharging prior to the voltage reaching a threshold voltage level.

The present invention provides various technical advantages over conventional transponder devices. For example, one technical advantage is in controlling the discharge of energy stored within the charge capacitor. Another technical advantage is quicker interrogation times for the transponder device. Yet another technical advantage is in having a larger reading range for the transponder signal. Other technical advantages are readily apparent to one skilled in the art from the following figures, descriptions, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
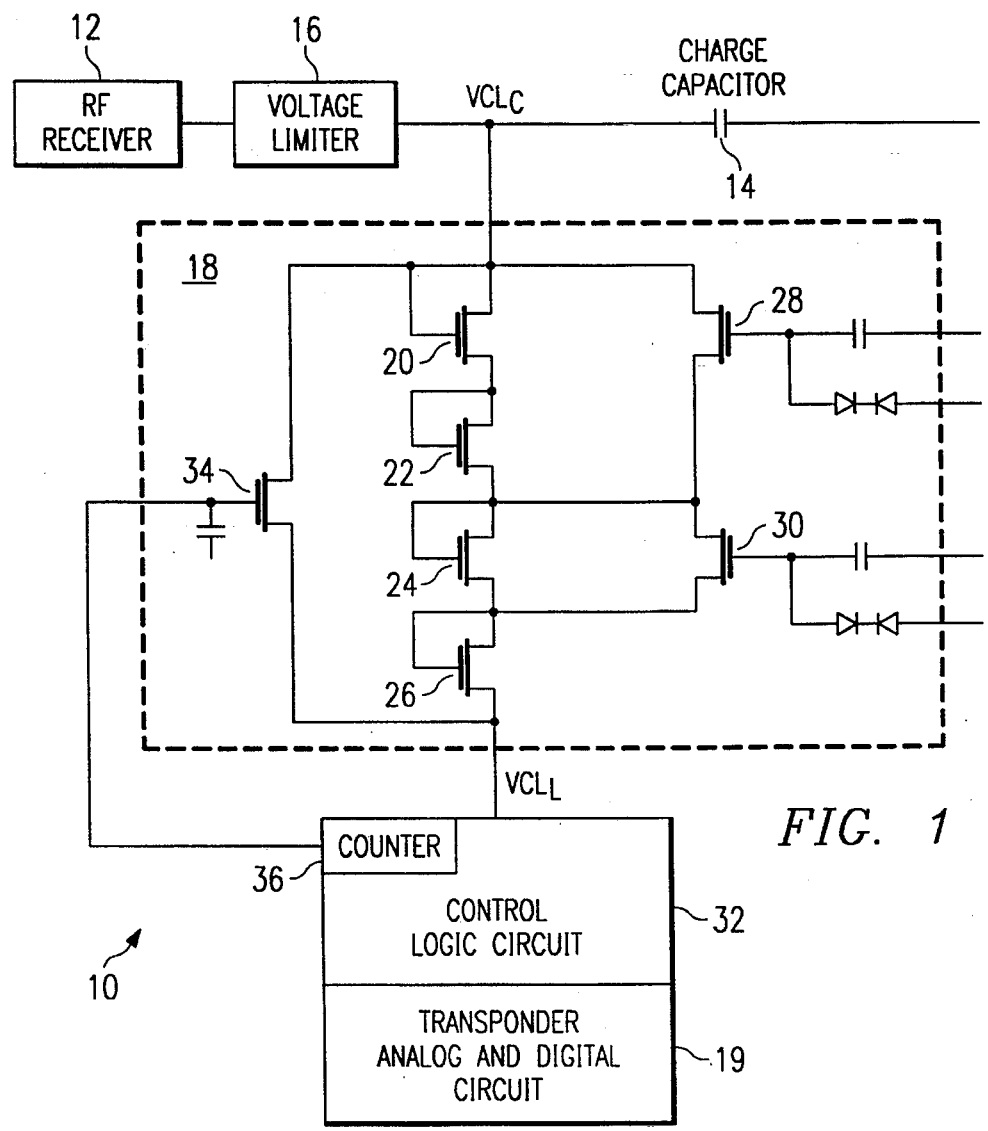
FIG. 1 illustrates a simplified schematic diagram of a transponder device.

FIG. 1 is a simplified schematic diagram of a transponder device 10. The basic operation of transponder device 10 can be found in U.S. Pat. No. 5,053,774 issued Oct. 1, 1991 to Schuermann, et al., entitled "Transponder Arrangement" and hereby incorporated by reference herein.

Transponder device 10 includes a radio frequency receiver 12 that receives an interrogation signal from a remote interrogation unit. The interrogation signal supplies energy that is stored within a charge capacitor 14. A voltage limiter 16 controls the amount of voltage that can be stored by charge capacitor 14. Transponder device 10 also includes a discharge circuit 18 that controls the discharge of energy from charge capacitor 14 for transmission of a data telegram by a transponder analog and digital circuit 19. Discharge circuit 18 includes a plurality of diodes 20, 22, 24, and 26 connected in series. Discharge circuit 18 also includes trimming elements 28 and 30 which may be connected or disconnected within discharge circuit 18 depending upon the desired minimum operating voltage for transponder analog and digital circuit 19. Discharge circuit 18 determines the appropriate voltage for operation of transponder analog and digital circuit 19. A control logic circuit 32 controls the transmission of a data telegram from transponder device 10 in response to the interrogation signal. Discharge circuit 18 also includes a transponder switch 34 that allows for control of discharge circuit 18 by control logic circuit 32 through a counter 36.

In operation, the diodes 20, 22, 24, and 26 of discharge circuit 18 allow charge capacitor 14 to store a sufficient amount of voltage for a full data telegram transmission from transponder device 10. The voltage $VCL_C$ represents the voltage level stored within charge capacitor 14. The voltage level $VCL_L$ represents the operating voltage required by control logic circuit 32 and transponder analog and digital circuit 19 in order to begin data telegram transmission. The difference between $VCL_C$ and $VCL_L$ represents the offset provided by discharge circuit 18 for proper operation. For example, control logic circuit 32 and transponder analog and digital circuit 19 may require a minimum operating voltage of three volts. Discharge circuit 18 ensures that charge capacitor 14 charges up to a higher voltage level before control logic circuit 32 sees a three volt level at $VCL_L$. Once the voltage on charge capacitor 14 reaches a threshold voltage level sufficient to power control logic circuit 32, data telegram transmission begins and counter 36 is activated. Counter 36 triggers transistor switch 34 to turn on when the voltage of charge capacitor 14 falls below the threshold voltage level. With transistor switch 34 turned on, the voltage control provided by discharge circuit 18 through diodes 20, 22, 24, and 26 is disabled and a direct connection is made between charge capacitor 14 and control logic circuit 32.

Though shown with four diodes connected in series, discharge circuit 18 may have any number of diodes connected in series or parallel arrangements or use other circuit elements that provide for discharge control of charge capacitor 14. Discharge circuit 18 may also have any number of trimming elements in order to adjust the threshold voltage level required for operation of control logic circuit 32. Trimming elements 28 and 30 may include non-volatile memory cells in order to provide the operating voltage trimming function. Further, any number of transistor switches 34 may be implemented in order to provide sequential disablement and bypassing of portions of discharge circuit 18. The minimum voltage for proper operation of control logic circuit 32 and transponder analog and digital circuit 19, $VCL_C$, and the number of diode elements 20, 22, 24, and 26 can be determined by test probing in order to set the trimming elements 28 and 30.

Figure 2:
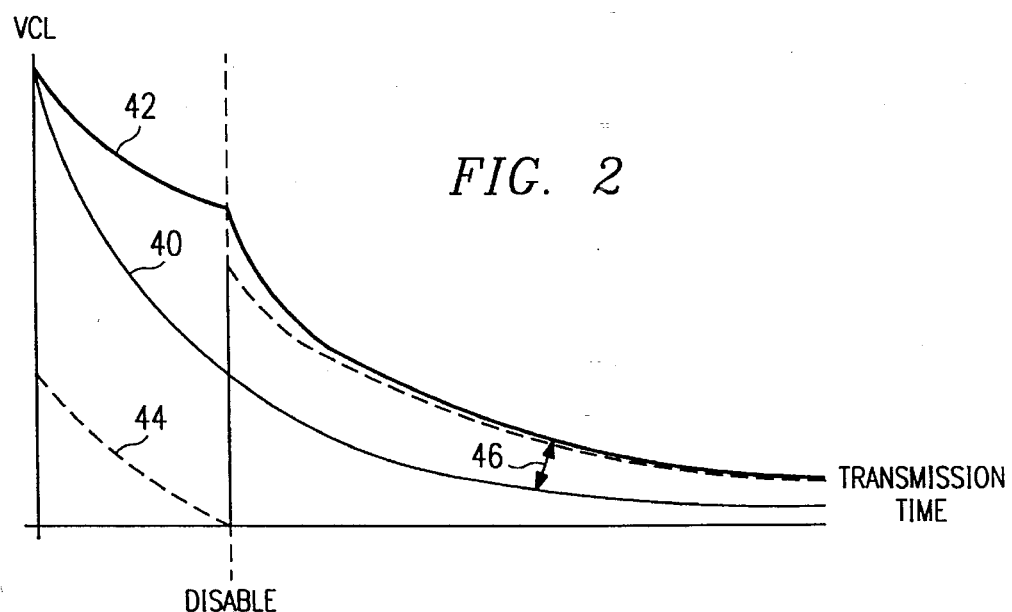
FIG. 2 illustrates a graph of the energy discharge of the charge capacitor within the transponder device.

FIG. 2 shows a graph showing the discharging of charge capacitor 14 with and without the use of discharge circuit 18. Without the use of discharge circuit 18, a high peak discharge of charge capacitor 14 occurs as shown in curve 40. This high peak discharge may cause a weakening of the transponder signal during data telegram transmission, causing a deterioration in the range of transponder device 10 or insufficient power for a full data telegram transmission. Discharge circuit 18 allows for a controlled discharge of charge capacitor 14 as shown in curve 42. Curve 42 represents the value of $VCL_C$ with the implementation of discharge circuit 18. Curve 44 represents the value of $VCL_L$ with the implementation of discharge circuit 18. As soon as the voltage within charge capacitor 14 reaches the threshold voltage level, transponder device 10 begins to transmit the data telegram. The threshold voltage level ensures that there is sufficient voltage to complete a full transmission of the data telegram. Once the threshold voltage level has been reached, transponder analog and digital circuit 19 begins transmitting the data telegram and activates counter 36. A difference 46 between curves 42/44 and 40 represents the voltage improvement obtained towards the end of a data telegram transmission as a result of discharge circuit 18.

When the voltage within charge capacitor 14 falls below the operating voltage level for control logic circuit 32 and transponder analog and digital circuit 19, counter 36 sends a control signal to discharge circuit 18 at transistor switch 34. The control signal activates transistor switch 34 to allow for direct connection between charge capacitor 14 and control logic circuit 32. By bypassing diodes 20, 22, 24, and 26 and disabling discharge circuit 18, the voltage $VCL_L$ driving control logic circuit 32 increases to the $VCL_C$ level of charge capacitor 14. By disabling discharge circuit 18, the increase in voltage supply to control logic circuit 32 ensures that sufficient voltage is available at the beginning and end of a full data telegram transmission without deteriorating the transponder signal from transponder device 10. The graph of FIG. 2 also shows that the use of discharge circuit 18 extends the time period for which an available operating voltage is present within transponder device 10.

In summary, a transponder device includes a discharge circuit that controls the discharge of voltage from a charge capacitor. The discharge circuit ensures that a threshold voltage level sufficient to complete a full transmission of a data telegram is attained prior to transmission by the transponder device. Once the threshold voltage level has been reached, the transponder device begins transmitting the data telegram in response to the voltage stored within the charge capacitor. During transmission, the voltage within the charge capacitor falls to the minimum operating voltage for the transponder device, causing a control signal to be activated in order to disable the discharge circuit. After disablement, the full voltage at the charge capacitor is available in order to complete transmission of the data telegram. The threshold voltage level may be adjusted by connecting or disconnecting elements within the discharge circuit according to the minimum operating voltage level desired for the transponder device.

Thus, it is apparent that there has been provided, in accordance with the present invention, a device for controlling discharge of a charge capacitor in a transponder that satisfies the advantages set forth above. Although the preferred embodiment has been described in detail, it should be understood that various changes, substitutions, and alterations can be made herein. For example, a different circuit structure other than that shown may be used to provide the discharge control of the charge capacitor. Other examples are readily ascertainable by one skilled in the art and may be made without departing from the spirit and scope of the present invention as defined by the following claims.

What is claimed is:

1. A transponder device, comprising:

a charge capacitor operable to store voltage in response to an interrogation signal;

a transponder analog and digital circuit operable to transmit a data telegram in response to a discharge of said voltage stored in said charge capacitor; and a discharge circuit operable to prevent said charge capacitor from discharging prior to said voltage reaching a threshold voltage level.

2. The transponder device of claim 1, wherein said discharge circuit allows said voltage to discharge from said charge capacitor when said voltage exceeds said threshold voltage level.

3. The transponder device of claim 2, wherein said discharge circuit prevents said charge capacitor from discharging said voltage when said voltage falls below said threshold voltage level.

4. The transponder device of claim 1, further comprising:

a control logic circuit operable to generate a control signal to disable said discharge circuit.

5. The transponder device of claim 4, wherein said control logic circuit includes a counter, said counter being activated when said voltage exceeds said threshold voltage level.

6. The transponder device of claim 5, wherein said counter generates a control signal operable to disable said discharge circuit.

7. The transponder device of claim 6, wherein said control signal disables said discharge circuit when said voltage falls below said threshold voltage level.

8. The transponder device of claim 1, wherein said discharge circuit includes a plurality of diodes, said plurality of diodes establishing said threshold voltage level.

9. The transponder device of claim 8, wherein said discharge circuit is operable to adjust said threshold voltage level by connecting or disconnecting at least one of said plurality of diodes.

10. The transponder device of claim 1, further comprising:

a voltage limiter operable to limit said voltage stored by said charge capacitor.

11. A device for controlling discharge of a charge capacitor in a transponder, comprising:

a discharge circuit operable to prevent the charge capacitor from discharging prior to a voltage of the charge capacitor reaching a threshold voltage level, said threshold voltage level being associated with an operating voltage level for the transponder.

12. The device of claim 11, wherein said discharge circuit includes at least one diode, said diode establishing said threshold voltage level.

13. The device of claim 11, wherein said discharge circuit is operable to receive a control signal, said control signal operable to disable said discharge circuit and allow the charge capacitor to discharge.

14. The device of claim 11, wherein said discharge circuit is operable to receive a trim signal, said trim signal operable to adjust said threshold voltage level.

15. The device of claim 14, wherein said trim signal connects or disconnects portions of said discharge circuit in order to adjust said threshold voltage level.

16. The device of claim 11, wherein said discharge circuit is operable to allow said charge capacitor to discharge when said voltage exceeds said threshold voltage level.

17. The device of claim 16, wherein said discharge circuit is operable to prevent discharging of the charge capacitor when said voltage falls below said threshold voltage level.

* * * * *